United States Patent [19]

Tremba

[11] 4,229,728
[45] Oct. 21, 1980

[54] TIRE PRESSURE MONITOR

[75] Inventor: Joseph A. Tremba, Farmington Hills, Mich.

[73] Assignee: Eaton Corporation, Cleveland, Ohio

[21] Appl. No.: 970,953

[22] Filed: Dec. 20, 1978

[51] Int. Cl.³ .................... B60C 23/04; H02K 21/08
[52] U.S. Cl. ................................ 340/58; 73/146.5; 200/61.22; 310/68 B; 310/74
[58] Field of Search ............ 340/58; 200/61.22, 61.25; 73/146.4, 146.5; 310/48, 67 A, 68 B, 257, 17, 74

[56] References Cited
U.S. PATENT DOCUMENTS

| | | | |
|---|---|---|---|
| 1,908,503 | 5/1933 | Behrend et al. | 340/58 |
| 2,894,246 | 7/1959 | De Graffenried | 340/52 |
| 3,215,978 | 11/1965 | Brown et al. | 340/58 |
| 3,533,063 | 10/1970 | Garcia | 340/58 |
| 3,558,940 | 1/1971 | Chestnut et al. | 310/257 X |
| 3,723,966 | 3/1973 | Mueller et al. | 340/58 |
| 3,751,697 | 8/1973 | Morley et al. | 310/257 X |
| 3,786,413 | 1/1974 | Ross et al. | 340/58 |
| 3,806,905 | 4/1974 | Strenglein | 340/58 X |
| 3,832,681 | 8/1974 | Kaida et al. | 340/58 |
| 3,858,174 | 12/1974 | Harris | 340/58 |
| 3,977,355 | 8/1976 | Lorenz et al. | 116/34 R |
| 4,075,603 | 2/1978 | Snyder et al. | 340/58 |
| 4,117,452 | 9/1978 | Snyder et al. | 340/58 |
| 4,160,234 | 7/1979 | Karbo et al. | 340/58 |

Primary Examiner—John W. Caldwell, Sr.
Assistant Examiner—Joseph E. Nowicki
Attorney, Agent, or Firm—R. J. McCloskey; D. Wood; J. G. Lewis

[57] ABSTRACT

Tire pressure monitors are incorporated in vehicles having pneumatic tires to continuously or periodically measure the air pressure in the tires and to alert the driver should the pressure in one of the tires fall below a predetermined value. A self-contained generator-transmitter unit is affixed to each wheel, each unit monitoring the air pressure in the tire associated therewith and generating an RF signal when the pressure falls below a predetermined value. A receiver, located in the passenger compartment of the vehicle, receives the signal(s) from the generator-transmitter units to indicate a low tire condition to the vehicle operator. The generators operate only during rotation of the wheels which effect relative rotation between two members in each generator, one member carrying a permanent magnet and the other carrying an inductor. The member carrying the inductor is mounted to a wheel and the second member is mounted for rotation proximate the first member, having a mass center which is displaced from the axis of the first member, resulting in a pendulum or vertical position seeking affect.

8 Claims, 7 Drawing Figures

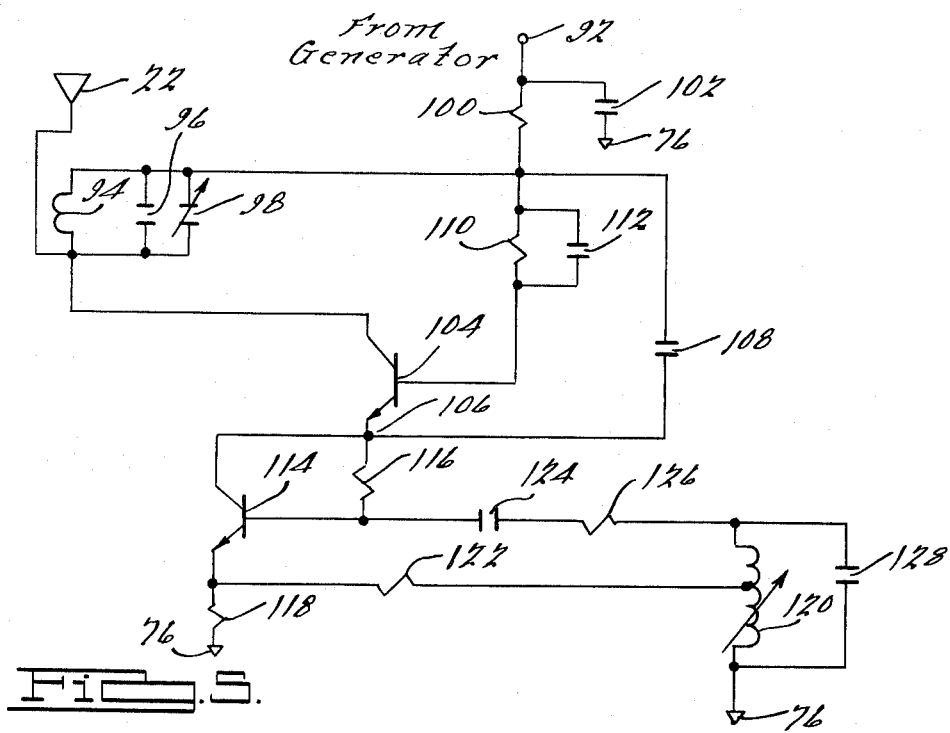
Fig. 5.
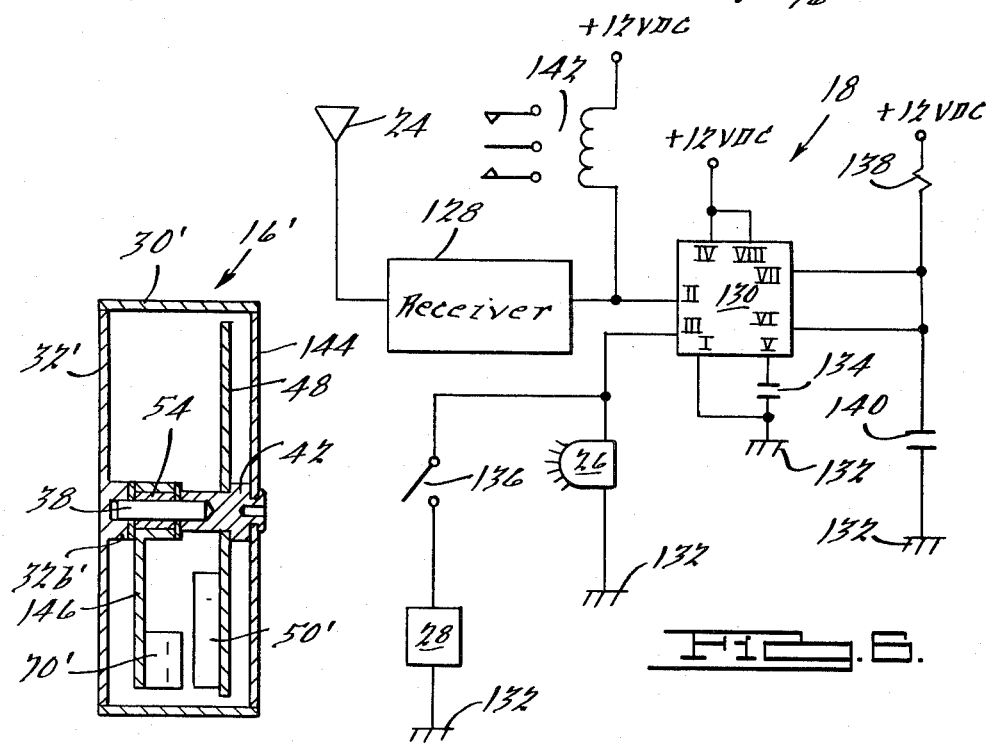
Fig. 6.
Fig. 7.

TIRE PRESSURE MONITOR

INTRODUCTION

This invention relates to apparatus for monitoring fluid presssure in pneumatic tires and specifically to such systems which continuously monitor fluid pressure in each tire of a vehicle and provide a warning signal to the operator should a low tire pressure condition occur.

BACKGROUND OF THE INVENTION

Since the invention of the pneumatic tire and its application to motor vehicles such as automobiles, trucks, and the like many schemes have been proposed to monitor the fluid pressure in the tires during operation of the vehicle. Such systems facilitate maintaining optimum fluid pressure in pneumatic tires which, in turn reduces the chances of catastrophic loss of vehicle control as well as extending tire life.

It will be apparent from a reading of the specification that the present invention may be advantageously utilized with pneumatic tires intended for many different applications. However, the invention is especially useful when applied to relatively high speed "on road" motor vehicles, and will be described in connection therewith.

A major problem in any tire pressure monitor is the transmission of fluid pressure information from the tire, i.e., a rotating body, to the operator i.e., a relatively fixed body. Most prior art approaches to this problem fall within three general catagories. The first approach is the direct reading of fluid pressure in a tire in which sealed, rotating fittings and electrical slip rings are employed in the interface between the wheel and vehicle body. The second approach is the transmission of fluid pressure information through an inductive coupling involving two transducers, one on the wheel and one on the vehicle body, which are in precise rotational alignment with one another. The third approach is the application of transmitters and receivers which use the atmosphere to bridge the interface between the wheel and body.

The first two approaches have several shortcomings. First, relatively expensive high precision components are needed in the slip rings and inductive coupling transducers which must remain in alignment at all times during operation of the vehicle. Additionally, both are prone to corrosion and mechanical wear at the point of interface as well as requiring relatively expensive body wiring from each wheel to a central location within the vehicle body.

Of the tire pressure monitors which have been commercially successful, most have followed the third approach, i.e., they have employed a transmitter affixed to each wheel which operates via a pressure switch to transmit a signal to a central receiver disposed within the vehicle body. These systems tend to be extremely expensive, however, and require a separate battery which must be periodically replaced. Additionally, transmitter-receiver approaches including interrogation type systems such as the transponder arrangement disclosed in U.S. Pat. No. 3,723,966 to Mueller et al. are contributors to RF pollution, the subject of current governmental regulatory study.

Also, most prior art systems employing any of the above described approaches include components such as transmitters, batteries and transducers which are mounted near the peripheral edge of the vehicle wheels, creating an imbalance condition which must be corrected by weights and the like. Additionally, due to the dynamic vibration involved in normal vehicle operation, the prior art systems have generally tended to deteriorate over a relatively short period of time, and those that did not suffer rapid deterioration were prohibitively costly for use with private passenger vehicles.

Finding a compromise solution for these problems has recently become even more urgent in light of government and industry interest in elimination of "spare" tires for cost and weight reasons and substituting "run flat" tires with a tire pressure monitor.

CROSS REFERENCES

The subject matter of the present application represents an improvement over that of U.S. application Ser. No. 959,533, filed Nov. 13, 1978.

BRIEF DESCRIPTION OF THE INVENTION

The present invention relates to a tire pressure monitor of the type wherein a transmitter monitors the air pressure within a tire and transmits a low tire condition signal to a remote receiver which, in turn, generates an alarm signal when the air pressure falls below a predetermined value. According to the present invention, the monitor includes a generator which, in application, is mounted to a wheel and which includes a first or housing member housing the transmitter and a second member which is disposed within the housing member and which rotates relative to the housing member during rotation of the wheel to power the transmitter. This arrangement has the advantage of providing an improved tire pressure monitor which conveniently packages the generator and transmitter portion of the monitor within compact units mounted upon one or more wheels which require no interfacing with the vehicle body.

According to another aspect of the invention, the tire pressure monitor further comprises a one-way roller clutch at the pivot point between the first and second members. This arrangement provides the advantage of enhancing relative rotation between first and second members, particularly during deacceleration of the vehicle.

According to another aspect of the invention, the tire pressure monitor further comprises a fluid pressure sensing transducer which is disposed within each wheel and includes a switch which is electrically disposed intermediate the generator and transmitter. This arrangement provides the advantage of allowing the monitor to generate RF signals only when a low tire condition occurs, thereby reducing RF pollution.

According to another aspect of the invention, the tire pressure monitor further comprises means operative to store electrical energy during relative rotation between the first and second members. This arrangement has the advantage of providing a tire pressure monitor with the capability of generating a low tire condition signal when rotation has ceased by employing stored electrical energy.

According to still another aspect of the invention, the tire pressure monitor further comprises means operative to receive the electrical energy at a time subsequent to the relative rotation such as when the vehicle is parked after being operated and to generate an operator alerting signal therewith. This arrangement provides the advantage of alerting the vehicle operator to a low tire pressure condition before the vehicle is moved.

These and other features and advantages of this invention will become apparent upon reading the following specification, which, along with the patent drawings, describes and discloses a preferred illustrative embodiment of the invention in detail.

The invention makes reference to the accompanying drawings.

BRIEF DESCRIPTION OF THE DRAWINGS

FIG. 5, is a schematic diagram of the transmitter portion of the preferred embodiment of the invention;

FIG. 6, is a schematic diagram of the receiver portion of the preferred embodiment of the invention; and FIG. 7, is a side cross-sectional view of an alternative embodiment of the generator/transmitter portion of the tire pressure monitor.

DETAILED DESCRIPTION OF THE SPECIFIC EMBODIMENT

Figure 1:
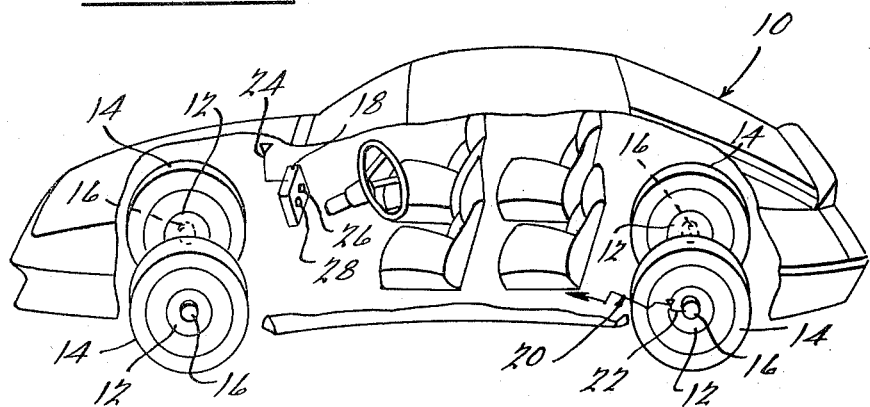
FIG. 1, is a broken perspective view of an automobile incorporating the preferred embodiment of the tire pressure monitor.

Referring to FIG. 1, an automobile 10 having a conventional compliment of wheels 12 and tires 14 mounted coaxially thereon is illustrated. A tire pressure monitor system is incorporated within automobile 10 and comprises four generator/transmitter units 16, one mounted coaxially upon each wheel 12, and a receiver unit 18 mounted within the passenger compartment of automobile 10. Generator/transmitter units 16 are disposed coaxially with wheels 12 so as not to create an imbalance condition. It is contemplated that generator/transmitter units 16 can be mounted directly to wheels 12 such as by intermediate mounting straps secured to the wheel mounting lugs (not illustrated) or, alternatively, within the hub portion of wheel covers or hub caps (not illustrated). Additionally, it is contemplated that generator/transmitter units 16 could be mounted so as not to be coaxial with wheels 12 if proper balancing were provided. Receiver unit 18 is mounted directly upon or behind the automobile instrument panel.

Each generator/transmitter unit 16 operates to generate an electrical potential during rotation of the wheel 12 and tire 14 assembly associated therewith. The electrical potential powers the transmitter portion of that generator/transmitter unit 16. Interposed between the generator and transmitter portions of each generator/transmitter unit 16 is a switch which is physically located within the wheel valve stem (not illustrated) and operates to electrically disconnect the generator from the transmitter when the air pressure within tire 14 exceeds a predetermined limit, and to connect the two when the air pressure within tire 14 falls below that limit. When that occurs, the electrical potential energizes the transmitter associated with the wheel which is supporting the "low" tire. In turn, the transmitter generates an RF signal, designated as 20, which is radiated from transmitter antenna 22 to receiving antenna 24 of receiver unit 18. A low tire alarm light 26 and an optional buzzer 28 are actuated upon receipt of a signal 20 from any one of the generator/transmitter units 16 to provide a sensible warning to the operator of automobile 10. When the air pressure within "low" tire 14 is again increased above the predetermined limit, switch interconnecting the generator and transmitter associated therewith will open, thereby ceasing the radiation of signal 20. Many pressure switches are known in the art which open or close a set of electrical contacts at a predetermined pressure level and the details of such a switch are deleted here for the sake of brevity.

Figure 2:
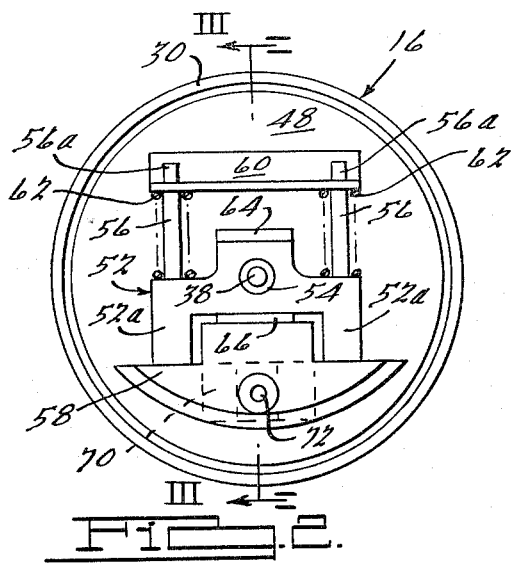
FIG. 2, is a front view of the generator/transmitter of the preferred embodiment of the invention with the front cover removed.
Figure 3:
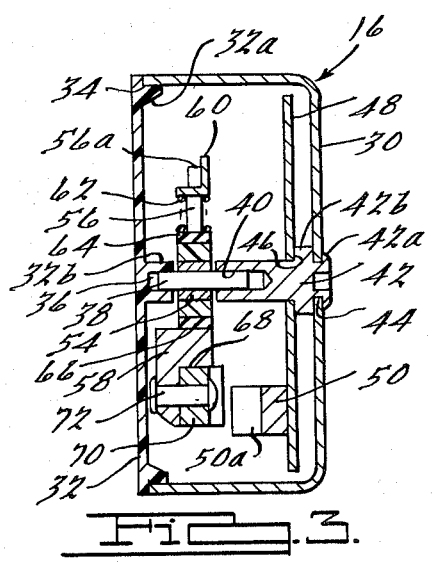
FIG. 3, is a side cross-sectional view of the generator/transmitter of FIG. 2 including front cover details.

Referring to FIGS. 2 and 3, the mechanical details of generator/transmitter unit 16 are illustrated. The device illustrated in FIGS. 2 and 3 is typical for all four of the generator/transmitter units 16 illustrated in FIG. 1. Each generator/transmitter unit 16 comprises a puck shaped housing 30 which is closed at one end by a housing cover 32. Cover 32 has an integral inwardly projecting annular rib 32a defining a land 34 which nestingly engages the opened end of housing 30. In the preferred embodiment of the invention, housing 30 is a metal stamping and cover 32 is constructed of plastic, the two being glued or pressed together. Cover 32 has an inwardly projecting cylindrical boss 32b disposed coaxially therewith. Boss 32b defines an inwardly opening axial bore 36 within which is disposed one end of a pin 38. The other end of pin 38 is disposed within a second inwardly open bore 40 which is defined by an inwardly projecting molded plastic support piece 42. Support piece 42 projects rightwardly, as viewed in FIG. 3, through an aperture 44 in the right-handmost wall of housing 30 and is affixed thereto by a heat staked portion 42a which mushrooms over the portion of housing 30 immediately adjacent aperture 44.

Support piece 42 has an area of increased diameter 42b immediately to the left of the right-hand wall of housing 30 which defines a land 46. Land 46 abuts a circuit board 48. Circuit board 48 has an aperture through which passes the left-handmost portion of support piece 42 which is in a press fit therewith. Accordingly, circuit board 48 is retained in the position illustrated by support piece 42. The discrete electrical components making up the generator and transmitter portions of generator/transmitter unit 16 are mounted on circuit board 48 using methods well known in the art. The actual components are not illustrated for sake of simplicity. A c-shaped core 50 of ferrous material is mounted to the left-handmost surface of circuit board 48, with the lags 50a of core 50 projecting inwardly.

A yoke 52 illustrated in FIG. 2 is mounted for rotation upon pin 38 through an intermediate needle bearing 54. Needle bearing 54 has operating characteristics well known in the art which will allow yoke 52 to rotate freely in one direction with respect to housing 32 but will resist rotation in the other direction. Yoke 52 is constructed of relatively light non-ferrous metal such as aluminum and is restrained from leftward and rightward displacement, as illustrated in FIG. 3, by right-handmost surface of boss 32b and left-handmost surface of support piece 42 respectively. Thus, yoke 52 is affixed axially as illustrated in FIG. 3 but is free to rotate in one direction about pin 38. Yoke 52 has two symmetrical radially outwardly disposed ears 52a having apertures through which pass pendulum guide pins 56. Guide pins 56 pass downwardly through the apertures in ears 52a and threadably engage a cresent shaped weight 58 which is constructed of relatively heavy material such as steel or lead. The uppermost ends of pins 56 each have an area of reduced diameter 56a which forms an interference fit through lanced apertures in a bracket 60. Disposed between the uppermost surface of ears 52a and the lowermost surface of bracket 60 are two compression loaded springs 62 which tend to bias bracket 60 as well as guide pins 56 and weight 58 upwardly with respect to yoke 52. The upper and lowermost surfaces of the center portion of yoke 52 support pads 64 and 66 respectively which are constructed of resilient material such as rubber and have adhesive backing for attachment to yoke 52. Weight 58, pins 56 and bracket 60 are illustrated in FIGS. 2 and 3 in their uppermost limit of travel wherein the uppermost surface of weight 58 abuts the lowermost surface of pad 66. The downwardmost limit of travel of weight 58, pins 56 and bracket 60 is defined at the point where a lowermost surface of bracket 60 abuts the uppermost surface of pad 64. The lower right-handmost portion of weight 58, as viewed in FIG. 3, has a relief 68 which receives a permanent magnet 70 which is secured thereto by a rivet 72. During relative rotation between core 50 and magnet 70, they pass within close proximity to one another.

For definitional purposes, the first member as recited in the claims refers to housing 30, cover 32, pin 38, support piece 42, circuit board 48 and core 50 all of which rotate with wheels 12. The second member, as recited in the claims, comprises yoke 52, guide pins 56, bracket 60, weight 58, springs 62, magnet 70 and rivet 72. In application, the second member acts as a pendulum, its mass center being displaced radially from the axis of pin 38 towards weight 58. Accordingly, the second member will be position seeking in operation and assume an orientation as illustrated in FIGS. 2 and 3 during constant velocity of automobile 10 and resulting angular velocity of wheels 12. During acceleration and deacceleration, the second member will tend to rotate about pin 38 but will return to the illustrated position once steady state conditions are achieved. The spring loading of weight 58 is provided to dampen vertical shock loading which occurs during normal operation of an automobile and tends to promote the life of generator/transmitter units 16.

Figure 4:
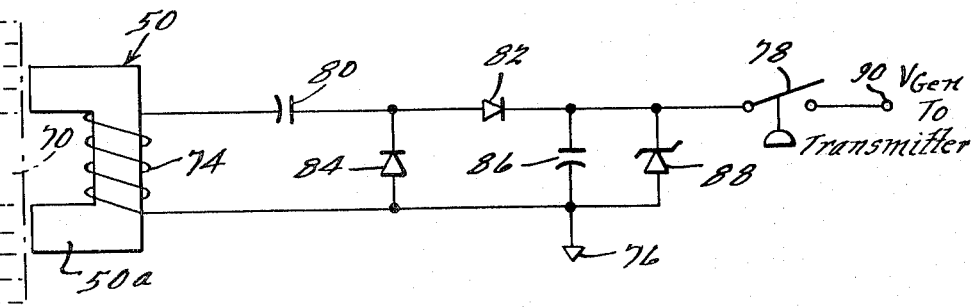
FIG. 4, is a schematic diagram of the generator portion of the preferred embodiment of the invention.

Referring to FIG. 4, the schematic diagram of the generator portion of generator/transmitter units 16 is illustrated. A coil 74 is wrapped around core 50 with one end being electrically connected to a tie point 76 and the other end to a switch 78 through a series combination of a 10 microfarad capacitor 80 and a forward biased type 1N914 diode 82. The common point of connection between capacitor 80 and diode 82 is connected to tie point 76 through a reverse biased type 1N914 diode 84. Capacitor 80 and diode 84 comprise a diode clamping circuit, the operation of which is well known in the art. The cathode side of diode 82 is connected to tie point 76 through a parallel combination of a 100 microfarad capacitor 86 and a reverse biased type 1N4738 Zener diode 88. Diodes 82 and 88 as well as capacitor 86 serve as a voltage doubler and rectifier. In operation, as magnet 70 passes by core 50, the magnetic path passing through core 50 will also pass partially or fully through magnet 70 and a sinusoidal waveform will result. As will be obvious to one skilled in the art, such a waveform, after passing through the voltage doubling rectification circuit, will result in a substantially DC signal having a level which is proportional to wheel speed. As stated hereinabove, it is contemplated that switch 78 could be easily incorporated into the valve stem in wheels 12 as would be obvious to one skilled in the art. However, it is contemplated that a separate pressure transducer, also readily available commercially could be used thereby allowing use of conventional tire valves. The other contact of switch 78 is thus deemed to be the generator output ($V_{gen}$) which is connected into the transmitter section of generator/transmitter units 16. Switch 78 is calibrated so as to be open when the air pressure within the tire 14 associated therewith is above 15 pounds per square inch. When the pressure falls below that level for any reason, switch 78 will close thereby impressing the output voltage of the generator section upon a terminal designated as 90 which, in turn, is connected to the transmitter associated with that wheel.

Referring to FIG. 5, a schematic diagram of the transmitter portion of generator/transmitter units 16 is illustrated. When an electrical potential is received at a terminal 92 which is electrically connected with terminal 90 of FIG. 4, the transmitter of FIG. 5 operates to generate an amplitude modulated (am) signal having a 300 mhz. carrier which is modulated at 19 khz. The am signal is transmitted via antenna 22. Antenna 22 is connected to one side of a tuned circuit comprising a parallel combination of a coil 94, a 4 picofarad capacitor 96 and a 2 to 20 pirofarad variable capacitor 98. The other side of the tuned circuit is connected to terminal 92 through a 510 ohm resistor 100. Terminal 92 is also connected to tie point 76 through a 4700 picofarad filter capacitor 102. Resistor 100 and capacitor 102 work together to form an RC filter which prevents radio frequency signals from travelling back into the generator. Antenna 22 is also connected to the collector of a type 2SE535 transistor 104 whose emitter is connected to a node 106. The end of the tuned circuit made up of coil 94 and capacitors 96 and 98 which is not connected with antenna 22 is connected to node 106 through a 0.001 microfarad capacitor 108 and to the base of transistor 104 through a parallel combination of a 100 kohm resistor 110 and a picofarad capacitor 112.

Node 106 is electrically connected to the collector of a type 2SE458 transistor 114 and interconnected to the base of transistor 114 through an 82 kohm resistor 116. The emitter of transistor 114 is connected to tie point 76 through an 820 ohm resistor 118 and to a tap within a variable coil 120 through an intermediate 220 ohm resistor 122. One end of coil 120 is electrically connected directly to tie point 76 and the other end is electrically connected to the base of transistor 114 through a series combination of a 0.039 microfarad capacitor 124 and a 3.9 kohm resistor 126. A 0.001 microfarad capacitor 128 bridges the ends of coil 120 forming a tuned circuit therewith.

The operational theory of the transmitter of FIG. 5 will not be elaborated upon inasmuch as it is well known in the art and is herein provided for example only. The portion of the circuitry of FIG. 5 above node 106 comprises a 300 mhz oscillator and the circuitry below node 106 comprises a 19 khz audio oscillator. The transmitter will thus operate to generate an am signal at antenna 22 whenever an adequate voltage potential is impressed at terminal 92. In the illustrated preferred embodiment, the output voltage of the generator at terminal 90 varies with wheel speed up to a limit of 8.2 volts which is set by diode 88. In actual practice this has been found to be approximately 25 miles an hour when the system is applied to a conventional passenger automobile. The voltage level produced by the generator will be adequate to generate an am signal to indicate a low tire condition once the output voltage from the generator approaches 4 volts. This has been found experimentally to be in the area of 5 miles per hour when applied to the same vehicle. Above 25 miles per hour (8.2 volts output from the generator) the output voltage will remain substantially constant. The generator circuit illustrated in FIG. 4 and the transmitter circuit illustrated in FIG. 5 are common for each of the four generator/transmitter units illustrated in FIG. 1, each transmitter generating a substantially identical am signal. However, it is contemplated that where a more elaborate system is desired, each generator could produce a distinctly separate signal which would be discriminated by receiver unit 18 and the operator notified not only of a low cut tire condition but which specific tire is involved.

Referring to FIG. 6, the schematic diagram of receiver unit 18 is illustrated. Antenna 24, which is dressed behind the instrument panel, is connected to a super regenerative receiver of the type manufactured by Tommy Electric, model R-13. It is contemplated, however, that any number of commercially available receivers could be employed, the only requirement being that the receiver be operative to detect the am signal generated by the four generator/transmitter units 16 and generate an output signal which is high when a signal is being received and low when there is no signal being received. The receiver on FIG. 6 is designated 128. The output of receiver 128 is electrically connected to input terminal II of a monostable multivibrator 130 such as manufactured by National Semi-Conductor model LM-555 which is being used herein as a conventional flip-flop. As used herein, the roman numeral terminal designations refer to the specific referenced component (multi-vibrator 130) and are for purposes of example only. It is contemplated that many equivalent devices are available on the market that could be substituted and that the specific component is only for illustration purposes.

Terminals IV and VIII of multi-vibrator 130 are connected to a +12 vdc power supply such as the automobile 10 ignition system. Terminal I of multi-vibrator 130 is connected directly to chassis ground which is generally designated as 132. Terminal V of multi-vibrator 130 is interconnected with ground 132 through a 0.01 microfarad capacitor 134. Output terminal III of multi-vibrator 130 is connected to chassis ground 132 through incandescent light 26 which is visible to the operator. Terminal III is also connected to ground 132 through a series combination of a manual single pole single throw switch 136 and buzzer 228. A series combination of a 100 kohm of resistor 138 and a 10 microfarad capacitor 140 interconnects the +12 vdc power supply and ground 132. The point of connection between resistor 138 and capacitor 140 is connected with terminals VII and VI of multi-vibrator 130. The coil of an auxilary relay 142 is interconnected between the +12 vdc power supply and terminal II of multi-vibrator 130.

Resistor 138 and capacitor 140 form an RC timing circuit which determines the pulse width of the output waveform at terminal III which, in the preferred embodiment, will have an "on" duration time of approximately one second. Accordingly, light 26 will flash having an "on" period of approximately one second and a relatively short "off" period. A latch could be provided as an additional feature so light 26 would remain on upon receiving the first signal from any of generator/transmitter units 16. Additionally, an auxilary buzzer 28 is provided with operator controlled cut-out switch 136 to provide an audible as well as a visual alarm.

Auxilary relay 142 is provided if any auxilary functions were desired. For example, capacitor 86 in FIG. 4 serves as a voltage storage device which remains charged once wheel rotation has ceased. The energy stored in capacitor 86 can be used to trigger a flag or other suitable warning device which will latch until being manually reset by the operator. An example of such a system would be a bi-stable flip-flop which is triggered by the receiver output to turn on a second incandescent light which is permanently connected to a +12 vdc source such as the automobile battery. In this example, when a car is parked and the ignition is turned off, if a tire goes flat and the air pressure therein falls below the predetermined value, switch 78 will close causing capacitor 78 to be discharged into its associated transmitter and a brief am signal generated thereby. This signal will be received by receiver 128 and the bi-stable flip-flop will turn on the supplemental warning light which would remain on until manually reset by the operator. When the operator next attempted to use the vehicle, he would have an immediate indication of a low tire condition and thus could remedy the problem prior to operating automobile 10. This feature is particularly important in vehicles which employ new low profile tires which are difficult to diagnose as being in the low air pressure cndition by visual inspection. By detecting a low tire condition prior to moving the vehicle, damage to the tire by operating it in such condition is eliminated thus promoting overall life of the tire.

Referring to FIG. 7, an alternative embodiment of a typical generator/transmitter unit 16' is illustrated. Unit 16' represents an economy or low cost version of that illustrated in FIGS. 2 and 3 but operates substantially in the same way. Generator/transmitter unit 16' comprises a puck shaped housing 30' which is closed at one end by a housing cover 32' and at the other end by housing backing plate 144. Housing backing plate 144 is constructed of plastic and is affixed to housing 30' by ultrasonic welding as is cover 32'. Cover 32' contains an integral boss 32b' as described in the discussion of the embodiment disclosed in FIGS. 2 and 3 which, along with supporting piece 42, supports pin 38. A solid pendulum 146 is pivotally mounted upon pin 38 on bearing 54. Pendulum 146 supports a magnet 70' so that it passes in close proximity with a core 50' of ferrous material. Core 50' is mounted upon circuit board 48 which, in turn, is supported by support piece 42 as described in a discussion of the device illustrated in FIGS. 2 and 3.

It is to be understood that the invention has been described with reference to specific embodiments which provide the features and advantages previously described, and that such specific embodiments are susceptible of modification, as will be apparent to those skilled in the art. Accordingly, the foregoing description is not to be construed in a limiting sense.

What is claimed is:

1. A tire pressure monitor for use in a vehicle having at least one pneumatic tire, said tire pressure monitor comprising:
   a cylindrical generator housing adapted for coaxial mounting upon an automobile wheel and defining a pivot internally axially aligned therewith;
   an inductor mounted within said housing for rotation therewith at a point radially spaced from said pivot, said inductor having a magnetic axis normal to said pivot;

a yoke mounted for rotation about said pivot;

a pendulum weight mounted to said yoke for rotation therewith, said weight being radially displaceable between a first position adjacent said yoke and a second position adjacent the circumferential wall of said housing;

spring means operative to bias said weight into said first position;

a permanent magnet mounted for displacement with said weight and disposed in rotational alignment with said inductor, said inductor and magnet coacting during relative rotation therebetween to generate an electrical potential;

transmitter means disposed within said housing, and operative to receive said electrical potential and to generate a low tire condition signal when the fluid pressure within said tire falls below a predetermined value; and receiver means disposed remotely from said transmitter means and operative to receive said low tire condition signal and to generate an alarm signal as a function thereof.

2. The tire pressure monitor of claim 1, wherein said low tire condition signal comprises a radio frequency signal.

3. The tire pressure monitor of claim 1, wherein said receiver means is disposed proximate a designated operator position and said alarm signal comprises a sensible alarm signal.

4. The tire pressure monitor of claim 1, further comprising a fluid pressure sensing transducer adapted for disposition within each wheel and including a switch electrically disposed intermediate the associated inductor and transmitter means.

5. The tire pressure monitor of claim 1, further comprising means operative to store electrical energy during said rotation.

6. The tire pressure monitor of claim 1, further comprising a one-way roller clutch disposed concentrically intermediate said pivot and yoke, said clutch operative to allow relative rotation between said pivot and yoke in one direction and to prohibit relative rotation between said pivot and yoke in the opposite direction.

7. The tire pressure monitor of claim 5, further comprising switch means operative to electrically interconnect said energy storage means and said transmitter when fluid pressure within said tire falls below a predetermined level at a time subsequent to said relative rotation, whereby said transmitter generates a post-vehicle operation low tire condition signal upon receiving said stored electrical energy.

8. The tire pressure monitor of claim 7, wherein said receiver means comprises means operative to receive said post-vehicle operation low tire condition signal and to generate an alarm signal as a function thereof.

* * * * *